(12) United States Patent
Pesyna et al.

(10) Patent No.: US 10,513,981 B2
(45) Date of Patent: Dec. 24, 2019

(54) HEAT EXCHANGER ASSEMBLY FOR A GAS TURBINE ENGINE PROPULSION SYSTEM

(71) Applicants: Rolls-Royce North American Technologies, Inc., Indianapolis, IN (US); Rolls-Royce Corporation, Indianapolis, IN (US)

(72) Inventors: Kenneth M. Pesyna, Carmel, IN (US); Douglas J. Snyder, Carmel, IN (US); Patrick C. Sweeney, Indianapolis, IN (US)

(73) Assignees: Rolls-Royce North American Technologies Inc., Indianapolis, IN (US); Rolls-Royce Corporation, Indianapolis, IN (US)

( * ) Notice: Subject to any disclaimer, the term of this patent is extended or adjusted under 35 U.S.C. 154(b) by 499 days.

(21) Appl. No.: 15/398,375

(22) Filed: Jan. 4, 2017

(65) Prior Publication Data

US 2018/0230908 A1 Aug. 16, 2018

Related U.S. Application Data

(60) Provisional application No. 62/281,413, filed on Jan. 21, 2016.

(51) Int. Cl.
*F02C 7/141* (2006.01)
*F02C 7/14* (2006.01)
(Continued)

(52) U.S. Cl.
CPC .............. *F02C 7/141* (2013.01); *B64D 27/16* (2013.01); *B64D 29/00* (2013.01); *B64D 33/08* (2013.01); *F01D 17/145* (2013.01); *F01D 25/12* (2013.01); *F02C 7/14* (2013.01); *F02C 7/185* (2013.01); *F02K 3/115* (2013.01); *B64D 2033/024* (2013.01); *F05D 2220/323* (2013.01); *F05D 2260/213* (2013.01); *F05D 2260/606* (2013.01); *Y02T 50/675* (2013.01)

(58) Field of Classification Search
CPC .... F02C 7/14; F02C 7/141; F02C 7/16; F02C 7/18; F02C 7/185; F02C 7/12; F02C 7/04; F01D 17/145; F01D 25/12
See application file for complete search history.

(56) References Cited

U.S. PATENT DOCUMENTS

| 4,374,469 A | 2/1983 | Rannenberg et al. |
| 5,012,646 A | 5/1991 | Speer |

(Continued)

FOREIGN PATENT DOCUMENTS

| EP | 2492199 A2 | 8/2012 |
| GB | 2474567 A | 4/2011 |

(Continued)

OTHER PUBLICATIONS

Extended European Search Report, European Application No. 17150309.7-1607, dated Jun. 7, 2017, 6 pages.

*Primary Examiner* — Craig Kim
(74) *Attorney, Agent, or Firm* — Barnes & Thornburg LLP

(57) ABSTRACT

A propulsion system including a gas turbine engine is disclosed herein. The propulsion system further includes a heat exchanger arranged outside the gas turbine engine and adapted to cool fluid from the gas turbine engine.

18 Claims, 4 Drawing Sheets

(51) Int. Cl.
  *F02K 3/115* (2006.01)
  *B64D 27/16* (2006.01)
  *B64D 29/00* (2006.01)
  *B64D 33/08* (2006.01)
  *F01D 17/14* (2006.01)
  *F01D 25/12* (2006.01)
  *F02C 7/18* (2006.01)
  *B64D 33/02* (2006.01)

(56) References Cited

U.S. PATENT DOCUMENTS

| | | | | |
|---|---|---|---|---|
| 5,123,242 | A * | 6/1992 | Miller | F02C 7/14 |
| | | | | 165/300 |
| 5,438,823 | A * | 8/1995 | Loxley | F01D 25/18 |
| | | | | 165/41 |
| 6,058,696 | A * | 5/2000 | Nikkanen | F02C 7/04 |
| | | | | 60/226.1 |
| 7,607,308 | B2 * | 10/2009 | Kraft | F02C 6/08 |
| | | | | 60/226.1 |
| 7,823,389 | B2 | 11/2010 | Seltzer et al. | |
| 9,045,998 | B2 | 6/2015 | Lo et al. | |
| 9,151,224 | B2 * | 10/2015 | Suciu | F01D 15/08 |
| 2008/0006021 | A1 * | 1/2008 | Schwarz | F02C 7/14 |
| | | | | 60/204 |
| 2008/0028763 | A1 * | 2/2008 | Schwarz | F01D 15/10 |
| | | | | 60/771 |
| 2008/0112798 | A1 | 5/2008 | Seitzer et al. | |
| 2008/0230651 | A1 * | 9/2008 | Porte | B64D 13/06 |
| | | | | 244/118.5 |
| 2009/0188234 | A1 | 7/2009 | Suciu et al. | |
| 2009/0301057 | A1 * | 12/2009 | Bulin | F02C 7/14 |
| | | | | 60/266 |
| 2010/0150700 | A1 | 6/2010 | Strecker et al. | |
| 2011/0088405 | A1 | 4/2011 | Turco | |
| 2012/0272658 | A1 * | 11/2012 | Murphy | F01D 17/085 |
| | | | | 60/783 |
| 2013/0092350 | A1 | 4/2013 | N. et al. | |
| 2013/0294887 | A1 | 11/2013 | Hains et al. | |
| 2013/0333390 | A1 * | 12/2013 | Barkowsky | F01D 17/105 |
| | | | | 60/782 |
| 2014/0248119 | A1 * | 9/2014 | Jen | F01D 9/02 |
| | | | | 415/1 |
| 2014/0345292 | A1 | 11/2014 | Diaz et al. | |
| 2014/0352315 | A1 | 12/2014 | Diaz | |
| 2015/0047367 | A1 | 2/2015 | Benignos | |
| 2015/0113999 | A1 | 4/2015 | Tretow et al. | |
| 2015/0176501 | A1 | 6/2015 | Mackin et al. | |
| 2016/0326903 | A1 * | 11/2016 | Xu | F01D 25/12 |
| 2017/0044984 | A1 * | 2/2017 | Pesyna | B64D 33/10 |

FOREIGN PATENT DOCUMENTS

| | | |
|---|---|---|
| WO | 2014051678 A1 | 4/2014 |
| WO | 2014055152 A2 | 4/2014 |
| WO | 2015126551 A1 | 8/2015 |
| WO | 2014120125 A1 | 8/2017 |

* cited by examiner

HEAT EXCHANGER ASSEMBLY FOR A GAS TURBINE ENGINE PROPULSION SYSTEM

CROSS REFERENCE TO RELATED APPLICATIONS

This application claims priority to and the benefit of U.S. Provisional Patent Application No. 62/281,413, filed 21 Jan. 2016, the disclosure of which is now expressly incorporated herein by reference.

FIELD OF THE DISCLOSURE

The present disclosure relates generally to propulsion systems, and more specifically to propulsion systems including gas turbine engines.

BACKGROUND

Propulsion systems used in some aircraft include gas turbine engines that have an engine core operable to generate thrust for moving the aircraft. To reduce the operating temperatures of components of the engine core, pressurized air passed through the engine core may be cooled using a cooling unit. When confronted with the space constraints of some gas turbine engines, placement of a cooling unit in the engine core presents a number of drawbacks.

SUMMARY

The present disclosure may comprise one or more of the following features and combinations thereof.

According to one aspect of the present disclosure, a propulsion system for an aircraft may include a gas turbine engine, a nacelle, and a heat exchanger assembly. The gas turbine engine may include an engine core defining a central axis and a fan coupled to the engine core, and the fan may be configured to discharge pressurized bypass air that is passed around the engine core through a fan duct that extends along the central axis coaxially with the engine core. The nacelle may be mounted to the gas turbine engine, and the nacelle may include an outer shroud that surrounds at least a portion of the engine core defining a portion of the fan duct and a strut that extends away from the engine core through the fan duct to the outer shroud. The heat exchanger assembly may be fluidly coupled to the gas turbine engine to cool fluid or gas from the gas turbine engine and return the cooled fluid or gas to the gas turbine engine. The heat exchanger assembly may include an inlet duct having at least a portion positioned in the strut, a heat exchanger housing coupled fluidly to the inlet duct and positioned radially inward of the strut relative to the central axis, heat exchangers housed by the heat exchanger housing, and a valve system that is movable in the heat exchanger housing from a first position arranged to direct pressurized bypass air received from the inlet duct into contact with the heat exchangers to a second position arranged to divert pressurized bypass air received from the inlet duct around the heat exchangers without contacting the heat exchangers.

In some embodiments, the heat exchanger assembly may further include an outlet duct fluidly coupled to the heat exchangers that extends aft of the strut along the central axis. The engine core may be configured to discharge core air that is passed through the engine core along the central axis, and the outlet duct may be configured to receive the pressurized bypass air from the inlet duct and discharge the pressurized bypass air into the core air when the valve system is in the first position. Additionally, in some embodiments, (i) the heat exchanger housing may define at least one heat exchanger passageway fluidly coupled to the inlet duct and configured to conduct pressurized bypass air from the inlet duct into contact with the heat exchangers when the valve system is in the first position and at least one bypass passageway fluidly coupled to the inlet duct and configured to conduct pressurized bypass air from the inlet duct around the heat exchangers without contacting the heat exchangers when the valve system is in the second position, and (ii) the outlet duct may be fluidly coupled to the at least one heat exchanger passageway and the at least one bypass passageway. At least two heat exchanger passageways may be spaced apart circumferentially from one another about the central axis. The at least one bypass passageway may be circumferentially arranged between the at least two heat exchanger passageways.

In some embodiments, the engine core may include a turbine having an inlet and an outlet positioned aft of the inlet along the central axis, an interior space may be defined in a radial direction relative to the central axis between the inlet of the turbine and the strut, and the heat exchanger housing may be positioned in the interior space. Additionally, in some embodiments, each of the heat exchangers may include a core having a face, and pressurized bypass air directed into contact with the heat exchangers by the valve system when the valve system is in the first position may be conducted by headers included in the heat exchanger housing to the core of each of the heat exchangers at an angle to the face of each of the heat exchangers that is different from 90 degrees.

According to another aspect of the present disclosure, a propulsion system for an aircraft may include a gas turbine engine, a nacelle, and a heat exchanger assembly. The gas turbine engine may include an engine core arranged along a central axis and a fan coupled to the engine core, and the fan may be configured to discharge pressurized bypass air that is passed around the engine core. The nacelle may surround a portion of the gas turbine engine, and the nacelle may include a strut that extends away from the gas turbine engine. The heat exchanger assembly may be fluidly coupled to the gas turbine engine to cool fluid or gas from the gas turbine engine, and the heat exchanger assembly may include an inlet duct arranged in the strut and a plurality of heat exchangers positioned radially inward of the strut relative to the central axis.

In some embodiments, the fan may be configured to discharge pressurized bypass air in a direction having a circumferential component and an axial component at an outlet thereof and the inlet duct may be shaped to open axially and circumferentially to receive the pressurized bypass air discharged from the fan. Additionally, in some embodiments, the heat exchangers may be fluidly coupled to the inlet duct such that a portion of the inlet duct is positioned radially inward of the strut relative to the central axis.

In some embodiments, the heat exchanger assembly may further include a heat exchanger housing that houses the heat exchangers and is fluidly coupled to the inlet duct and a valve system that is movable in the heat exchanger housing from a first position arranged to direct pressurized bypass air received from the inlet duct into contact with the heat exchangers to a second position arranged to divert pressurized bypass air received from the inlet duct around the heat exchangers without contacting the heat exchangers. The heat exchanger assembly may further include an outlet duct fluidly coupled to the heat exchangers that is positioned radially inward of the strut relative to the central axis. The engine core may be configured to discharge core air that is passed through the engine core along the central axis and the outlet duct may be configured to receive the pressurized bypass air from the inlet duct and discharge the pressurized bypass air into the core air when the valve system is in the first position.

According to yet another aspect of the present disclosure, a propulsion system for an aircraft may include a gas turbine engine, a nacelle, and a heat exchanger assembly. The gas turbine engine may include an engine core and a fan coupled to the engine core, and the fan may be configured to discharge pressurized bypass air that is passed around the engine core. The nacelle may surround a portion of the gas turbine engine. The heat exchanger assembly may be fluidly coupled to the gas turbine engine to cool fluid or gas from the gas turbine engine. The heat exchanger assembly may include an inlet duct having a divider wall defining a first inlet passage and a second inlet passage, a heat exchanger housing fluidly coupled to the inlet duct, first heat exchangers housed by the heat exchanger housing and fluidly coupled to the first inlet passage, second heat exchangers housed by the heat exchanger housing and fluidly coupled to the second inlet passage, a first valve that is movable in the heat exchanger housing from a contacting position arranged to direct pressurized bypass air passed through the first inlet passage into contact with the first heat exchangers to a diverting position arranged to divert pressurized bypass air passed through the first inlet passage around the first heat exchangers without contacting the first heat exchangers, and a second valve that is movable in the heat exchanger housing from a contacting position arranged to direct pressurized bypass air passed through the second inlet passage into contact with the second heat exchangers to a diverting position arranged to divert pressurized bypass air passed through the second inlet passage around the second heat exchangers without contacting the second heat exchangers.

In some embodiments, the first heat exchangers may each include a core having a face, and pressurized bypass air directed into contact with the first heat exchangers by the first valve when the first valve is in the contacting position may be conducted by a first header included in the heat exchanger housing to the core of each of the first heat exchangers at an angle to the face of each of the first heat exchangers that is different from 90 degrees. The second heat exchangers may each include a core having a face, and pressurized bypass air directed into contact with the second heat exchangers by the second valve when the second valve is in the contacting position may be conducted by a second header included in the heat exchanger housing to the core of each of the second heat exchangers at an angle to the face of each of the second heat exchangers that is different from 90 degrees.

In some embodiments, the first valve may include a first plate, the first plate may be coupled to an actuator, and the actuator may be operable to pivot the first plate within the heat exchanger housing to cause the first valve to move between the contacting and diverting positions. The second valve may include a second plate, the second plate may be coupled to the actuator, and the actuator may be operable to pivot the second plate within the heat exchanger housing to cause the second valve to move between the contacting and diverting positions. Additionally, in some embodiments, the fan may be configured to discharge pressurized bypass air in a direction having a circumferential component and an axial component at an outlet thereof and each of the first and second inlet passages may be shaped to open axially and circumferentially to receive the pressurized bypass air discharged from the fan so that the total pressure of the pressurized bypass air is captured by the first and second inlet passages during operation of the propulsion system.

These and other features of the present disclosure will become more apparent from the following description of the illustrative embodiments.

DETAILED DESCRIPTION OF THE DRAWINGS

Figure 1:
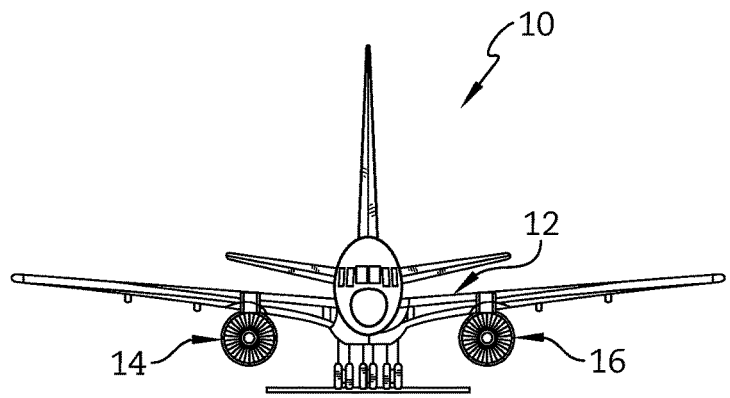
FIG. 1 is a front elevation view of an aircraft including an airframe and a pair of propulsion systems supported by the airframe that each have a gas turbine engine and a nacelle that surrounds a portion of the gas turbine engine and is coupled to the airframe.

Referring now to FIG. 1, an illustrative aircraft 10 includes an airframe 12 and a pair of propulsion systems 14, 16 that are coupled to the airframe 12 opposite one another. The propulsion systems 14, 16 are substantially identical to one another. In other embodiments, the aircraft 10 may include another suitable number of propulsion systems other than the two propulsion systems 14, 16.

Figure 2:
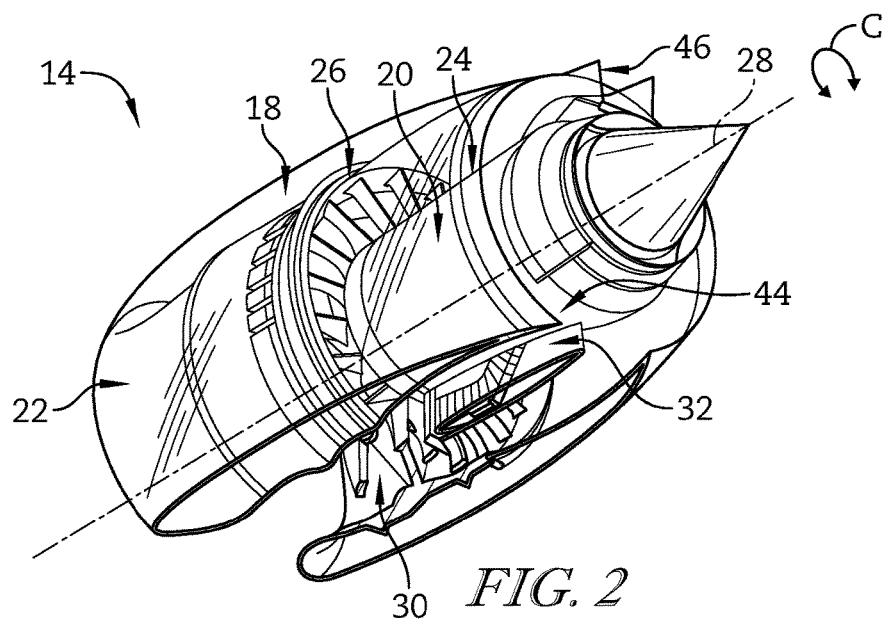
FIG. 2 is a cutaway perspective view of one of the propulsion systems of FIG. 1 detached from the airframe and showing that the nacelle includes a strut that extends downwardly away from the gas turbine engine toward an outer shroud.

Referring now to FIG. 2, the propulsion system 14 illustratively includes a nacelle 18 and a gas turbine engine 20. The nacelle 18 is coupled to the airframe 12 and mounted to the gas turbine engine 20 as shown in FIG. 1. The nacelle 18 has an outer shroud 22 that surrounds at least a portion of the gas turbine engine 20 as shown in FIG. 2. The gas turbine engine 20 is configured to generate thrust to move the aircraft 10 while being supported in the nacelle 18.

The gas turbine engine 20 illustratively includes an engine core 24 and a fan 26 that is coupled to the engine core 24 to be driven by the engine core 24 as shown in FIG. 2. The engine core 24 is configured to pass pressurized air therethrough so that the pressurized air flows aftward along a central axis 28 defined by the engine core 24. The fan 26 is configured to discharge pressurized bypass air that is passed around the engine core 24 through a fan duct 30 that extends along the central axis 28 coaxially with the engine core 24. The fan duct 30 is defined between the outer shroud 22 and the engine core 24. A strut 32 included in the nacelle 18 extends away from the engine core 24 through the fan duct 30 to the outer shroud 22 in a radial direction indicated by arrow R as shown in FIG. 3.

Figure 5:
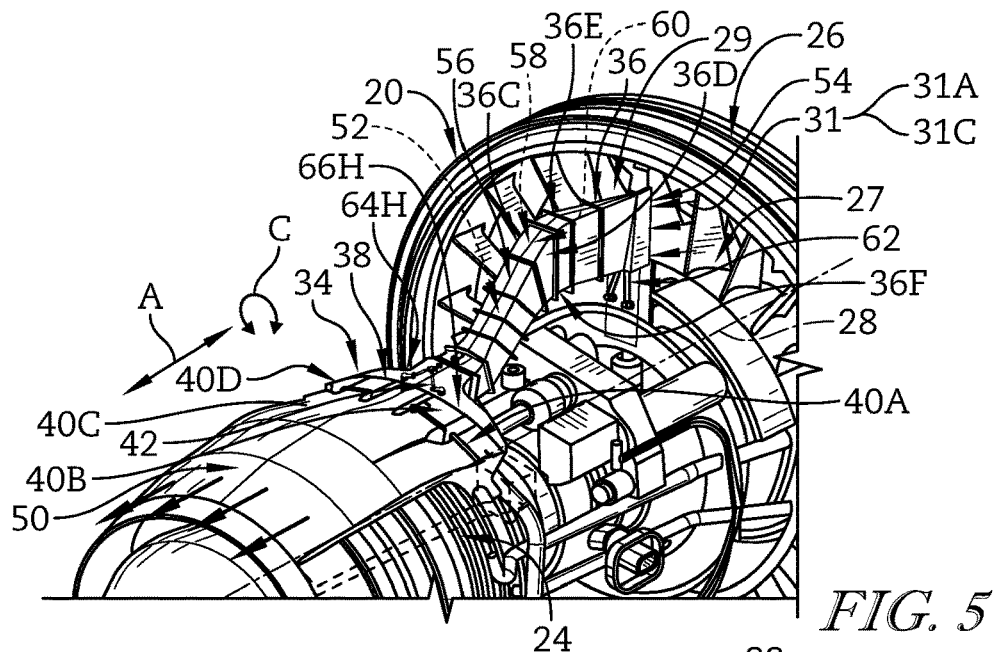
FIG. 5 is a bottom perspective view of the propulsion system of FIG. 3 with portions of the nacelle removed to show that the heat exchanger assembly includes (i) the inlet duct moving through a fan duct that is coaxial with the engine core configured to receive pressurized bypass air discharged from the fan, (ii) the heat exchangers arranged in a heat exchanger housing that is configured to interact with the pressurized bypass air from the inlet duct, and (iii) the outlet duct coupled to the heat exchanger housing that is configured to discharge pressurized bypass air after interaction with the heat exchangers into a pressurized bypass air stream passed around the engine core.
Figure 6:
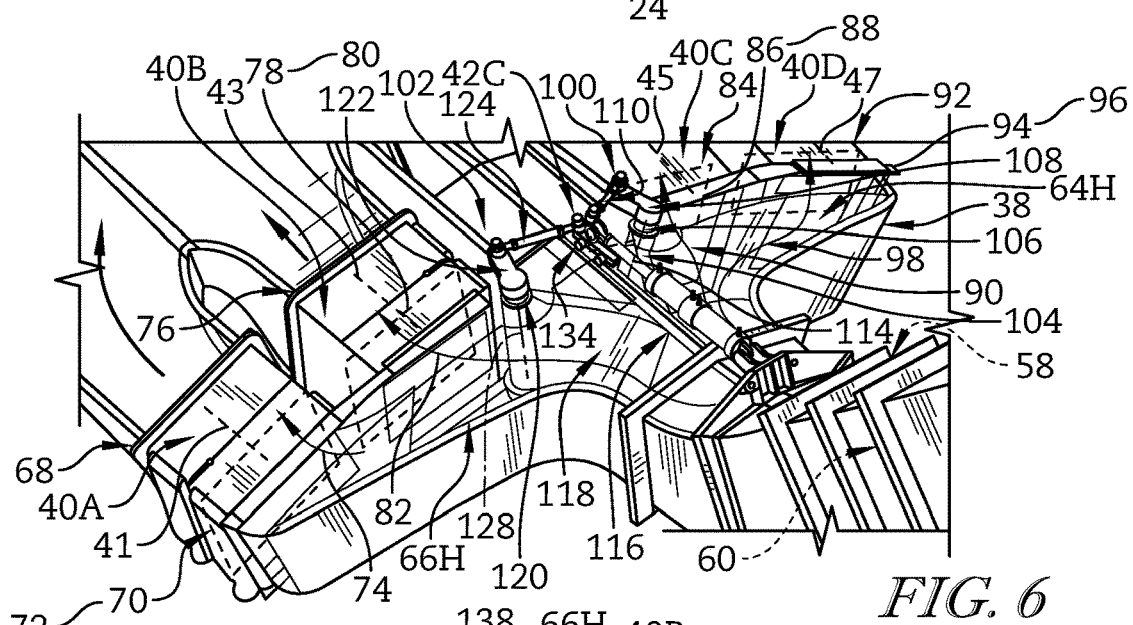
FIG. 6 is a perspective view of the propulsion system of FIG. 5 with portions of the gas turbine engine removed, showing that the heat exchanger assembly includes a valve system that is movable in the heat exchanger housing to a first position arranged to direct pressurized bypass air passed through the inlet duct into contact with the heat exchangers.
Figure 7:
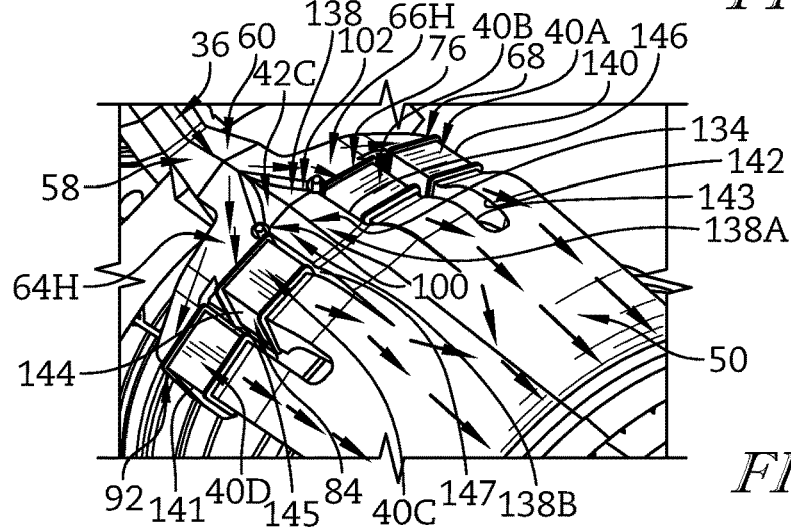
FIG. 7 is a perspective view of the propulsion system of FIG. 5 with portions of the heat exchanger assembly removed, showing that pressurized bypass air passed through the inlet duct and into contact with the heat exchangers is conducted through heat exchanger passageways formed in the heat exchanger housing before being discharged by the outlet duct.

The propulsion system 14 further illustratively includes a heat exchanger assembly 34 as shown in FIGS. 5-7. The heat exchanger assembly 34 is fluidly coupled to the gas turbine engine 20 to cool fluid or gas from the gas turbine engine 20 and return the cooled fluid or gas to the gas turbine engine 20. For example, the heat exchanger assembly 34 may be configured to cool oil, fuel, cooling air, and/or other fluid/gasses present in the gas turbine engine 20. The heat exchanger assembly 34 is configured to cool fluid or gas from the gas turbine engine 20 using pressurized bypass air that is passed through the fan duct 30.

The heat exchanger assembly 34 illustratively includes an inlet duct 36, a heat exchanger housing 38, heat exchangers 40, and a valve system 42 as shown in FIGS. 3-7. A portion 36A of the inlet duct 36 is positioned in the strut 32 and a portion 36B of the inlet duct 36 is positioned radially inward of the strut 32 relative to the central axis 28. The heat exchanger housing 38 is fluidly coupled to the portion 36B of the inlet duct 36 and positioned radially inward of the strut 32 relative to the central axis 28. The heat exchangers 40 are housed by the heat exchanger housing 38 and the valve system 42 is movable in the heat exchanger housing 38 from a contacting position 42C shown in FIG. 6 to a diverting position 42D shown in FIG. 8. The contacting position 42C is arranged to direct pressurized bypass air received from the inlet duct 36 into contact with the heat exchangers 40. The diverting position 42D is arranged to divert pressurized bypass air received from the inlet duct 36 around the heat exchangers 40 without contacting the heat exchangers 40.

Figure 3:
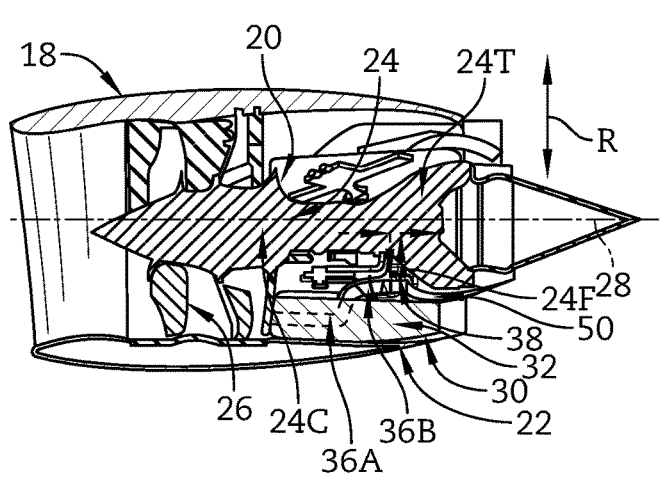
FIG. 3 is a sectional view of the propulsion system of FIG. 2 showing that the gas turbine includes an engine core defining a central axis and a fan coupled to the engine core, that the strut is positioned radially outward of the engine core relative to the central axis, and that a heat exchanger assembly included in the propulsion system has an inlet duct arranged in the strut and heat exchangers arranged outside of the strut and mounted to the engine core.

When the valve system 42 is in the contacting position 42C, fluid from the engine core 24 passes along a flow path 24F as shown in FIG. 3. Specifically, fluid from the engine core 24 passes along the flow path 24F from one component of the engine core 24 through the heat exchangers 40 and is returned to another component of the engine core 24 by the heat exchangers 40. In one embodiment, fluid may be provided to the heat exchangers 40 along the flow path 24F by a compressor 24C of the engine core 24 and returned to a turbine 24T of the engine core 24 along the flow path 24F to cool the turbine 24T.

In other embodiments, the heat exchangers 40 may be adapted to cool oil, fuel, or any other fluid that is provided thereto by the engine core 24 or by any other part of the aircraft 10. In those embodiments, fluid may be provided to the heat exchangers 40 by the engine core 24 or by any other part of the aircraft 10 along another suitable flow path. Additionally, in those embodiments, fluid provided to the heat exchangers 40 may be returned to the engine core 24 or any other part of the aircraft 10 along another suitable flow path.

Referring again to FIG. 2, the strut 32 illustratively extends radially through the fan duct 30 away from an engine case 44 of the gas turbine engine 20 to the outer shroud 22. The strut 32 is spaced from a pylon 46 included in the nacelle 18 that is configured to couple to the airframe 12 and extends away from the gas turbine engine 20. Specifically, the strut 32 is spaced about 180 degrees from the pylon 46 about the central axis 28 in a circumferential direction indicated by arrow C. When the propulsion system 14 is coupled to the airframe 12 as shown in FIG. 1, the pylon 46 is positioned above the gas turbine engine 20, whereas the strut 32 is positioned below the engine 20. In other embodiments, however, the strut 32 and the pylon 46 may be arranged relative to the gas turbine engine 20 in other suitable arrangements.

Figure 4:
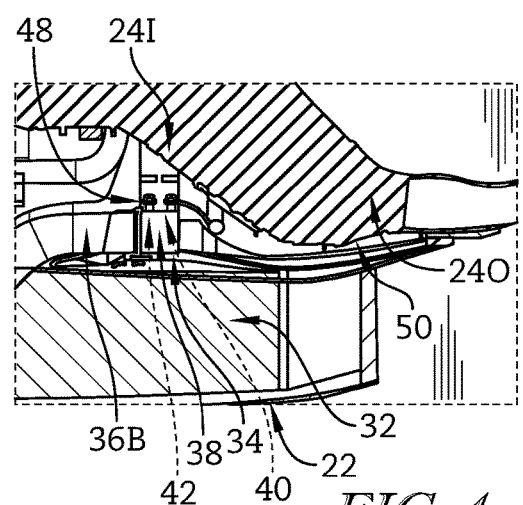
FIG. 4 is a detail view of the propulsion system of FIG. 3 showing that the heat exchangers of the heat exchanger assembly are arranged radially between the strut and the engine core and that an outlet duct included in the heat exchanger assembly extends aft of the strut along the central axis.

Referring now to FIGS. 3 and 4, the turbine 24T extends along the central axis 28 from a turbine inlet 24I to a turbine outlet 24O that is positioned aft of the turbine inlet 24I. An interior space 48 is radially defined between the turbine inlet 24I and the strut 32, and the heat exchanger housing 38 is illustratively positioned in the interior space 48. The illustrative positioning of the heat exchanger housing 38 allows more heat exchangers 40 to be included in the heat exchanger assembly 34 than would be the case if the heat exchanger housing 38 was positioned closer to the turbine outlet 24O along the central axis 28.

The heat exchanger assembly 34 illustratively includes an outlet duct 50 that is fluidly coupled to the heat exchangers 40 as shown in FIGS. 3 and 4. The outlet duct 50 is configured to discharge pressurized bypass air provided thereto by the inlet duct 36 to the fan duct 30. The outlet duct 50 is positioned radially inward of the strut 32 relative to the central axis 28 and the outlet duct 50 extends aft of the strut 32 along the central axis 28.

Referring now to FIG. 5, the illustrative inlet duct 36 is shown in greater detail. The inlet duct 36 includes opposite walls 36C, 36D that are interconnected with one another by opposite walls 36E, 36F. The walls 36C, 36D, 36E, 36F cooperate with one another to form an inlet passageway 52 arranged to receive pressurized bypass air discharged by the fan 26 through the fan duct 30.

The walls 36C, 36D, 36E, 36F illustratively extend toward the fan 26 and cooperate to define an inlet 54 adjacent thereto that opens into the inlet passageway 52 and toward the fan 26 as shown in FIG. 5. The walls 36C, 36D, 36E, 36F extend aftward and radially inward of the inlet 54 so that the walls 36C, 36D, 36E, 36F are coupled to the heat exchanger housing 38. The inlet 54 is configured to receive pressurized bypass air discharged by the fan 26 through the fan duct 30 and conduct the bypass air to the inlet passageway 52 and toward the heat exchanger housing 38. The heat exchanger housing 38 is configured to receive bypass air conducted through the inlet passageway 52.

The inlet duct 36 illustratively includes a divider wall 56 that is positioned within the inlet passageway 52 as shown in FIG. 5. The divider wall 56 extends along the length of the inlet duct 36 between the inlet 54 and the heat exchanger housing 38 to divide the inlet passageway 52 into a first inlet passage 58 and a second inlet passage 60. The inlet 54 opens into each of the first and second inlet passages 58, 60 and each of the first and second inlet passages 58, 60 are fluidly coupled to the heat exchanger housing 38.

In the illustrative embodiment, the inlet duct 36 includes only one divider wall 56. In other embodiments, however, the inlet duct 36 may include more than one divider wall 56. In other embodiments still, the inlet duct 36 may not include a divider wall 56 at all.

The first inlet passage 58 is illustratively configured to conduct pressurized bypass air provided thereto by the inlet 54 to the heat exchanger housing 38 as shown in FIGS. 5 and 6. The first inlet passage 58 is defined by the walls 36C, 36E, 36F and the divider wall 56.

Like the first inlet passage 58, the second inlet passage 60 is illustratively configured to conduct pressurized bypass air provided thereto by the inlet 54 to the heat exchanger housing 38 as shown in FIGS. 5 and 6. The second inlet passage 60 is defined by the walls 36D, 36E, 36F and the divider wall 56.

The inlet duct 36 illustratively provides two circuits (i.e., the first and second inlet passages 58, 60) for conducting pressurized bypass air discharged by the fan 26 between the inlet 54 and the heat exchanger housing 38 as suggested by FIG. 6. Bypass air is conducted by the first inlet passage 58 between the inlet 54 and the heat exchanger housing 38 in substantially the same fashion as bypass air is conducted by the second inlet passage 60 between the inlet 54 and the heat exchanger housing 38.

Figure 8:
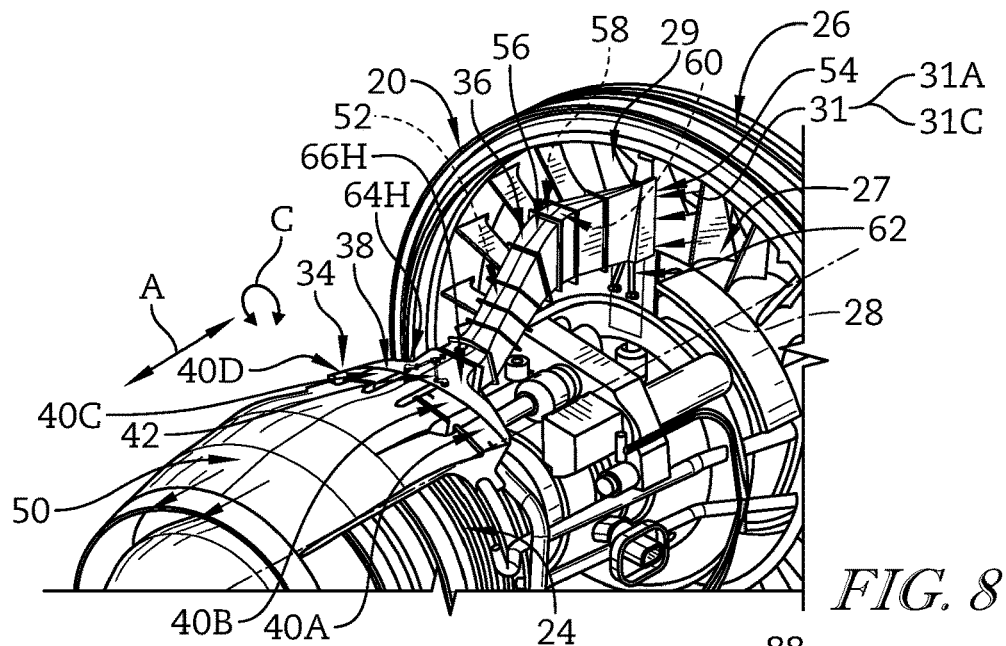
FIG. 8 is a perspective view of the propulsion system of FIG. 5 with portions of the nacelle removed, showing that pressurized bypass air discharged from the fan is passed through the inlet duct and the heat exchanger housing and discharged by the outlet duct without interacting with the heat exchangers.

As best seen in FIGS. 5 and 8, pressurized bypass air is discharged by fan blades 27 of the fan 26 at a fan outlet 29 to the inlet 54 in a direction 31. The direction 31 illustratively has an axial component 31A in the axial direction indicated by arrow A. The direction 31 also has a circumferential component 31C in the circumferential direction indicated by arrow C. Each of the first and second inlet passages 58, 60 are shaped at the inlet 54 to open in the axial direction indicated by arrow A and in the circumferential direction indicated by arrow C. In this way, the first and second inlet passages 58, 60 are shaped to receive the bypass air discharged by the fan 26 at the fan outlet 29 in the direction 31. Accordingly, substantially all of the total pressure of the bypass air discharged by the fan 26 is captured by the inlet duct 36 in operation of the propulsion system 14.

In other embodiments, the inlet duct 36 may include another type of inlet adapted for use in the manner described above with regard to the inlet 54. For example, the inlet duct 36 may include a NACA inlet or any other similar inlet that forms a generally smooth contour with a surface of the strut 32.

The inlet duct 36 is supported relative to the gas turbine engine 20 and components thereby by supports 62 as shown in FIG. 5. Two of the supports 62 are illustratively positioned generally radially inward of the inlet 54 relative to the central axis 28. In other embodiments, however, the supports 62 may include any suitable number of supports other than two supports that are arranged relative to the inlet 54 in any other suitable arrangement.

Referring again to FIG. 5, the heat exchangers 40 are illustratively housed by the heat exchanger housing 38 so that the heat exchangers 40 are arranged circumferentially adjacent one another about the central axis 28. To accommodate the arrangement of the heat exchangers 40, the heat exchanger housing 38 extends circumferentially about the central axis 28.

In the illustrative embodiment, the heat exchangers 40 include four substantially identical heat exchangers 40A, 40B, 40C, 40D. The heat exchangers 40A, 40B, 40C, 40D are configured to transfer heat from the fluid passing along the path 24F to bypass air discharged from the fan 26 that contacts the heat exchangers 40A, 40B, 40C, 40D. The heat exchangers 40A, 40B, 40C, 40D may each be embodied as any device configured for use as described above and sized to be housed by the heat exchanger housing 38 within the interior space 48. In one example, the heat exchangers 40A, 40B, 40C, 40D may each be embodied as a tube bank heat exchanger. In another example, the heat exchangers 40A, 40B, 40C, 40D may each be embodied as any one of a plate heat exchanger, a plate-and-fin heat exchanger, or the like.

In other embodiments, however, the heat exchangers 40 may include another suitable number of heat exchangers. For example, as suggested by FIG. 5, the heat exchangers 40 may include five heat exchangers. In that example, the heat exchanger housing 38 may be adapted to house five heat exchangers and the inlet duct 36 and the heat exchanger housing 38 may be adapted to conduct pressurized bypass air discharged by the fan 26 to the five heat exchangers. Additionally, in that example, the outlet duct 50 may be adapted to receive bypass air directed into contact with the additional heat exchanger when the valve system 42 is in the contacting position 42C.

Referring now to FIG. 6, the heat exchanger housing 38 illustratively includes headers 64H, 66H. When the valve system 42 is in the contacting position 42C shown in FIG. 6, the header 64H is configured to conduct pressurized bypass air conducted through the first inlet passage 58 to the heat exchangers 40C, 40D. Additionally, when the valve system 42 is in the contacting position 42C, the header 66H is configured to conduct bypass air conducted through the second inlet passage 60 to the heat exchangers 40A, 40B. When the valve system 42 is in the diverting position 42D shown in FIG. 9, the header 64H is configured to conduct bypass air conducted through the first inlet passage 58 around the heat exchangers 40C, 40D without contacting the heat exchangers 40C, 40D. Additionally, when the valve system 42 is in the diverting position 42D, the header 66H is configured to conduct bypass air conducted through the second inlet passage 60 around the heat exchangers 40A, 40B without contacting the heat exchangers 40A, 40B.

The heat exchanger 40A is illustratively positioned within a heat exchanger passageway 68 defined by the heat exchanger housing 38 as shown in FIG. 6. Specifically, the heat exchanger 40A is positioned within the passageway 68 so that the heat exchanger 40A extends along a heat exchanger axis 41 that is substantially perpendicular to a face 70 of a core 72 of the heat exchanger 40A. When the valve system 42 is in the contacting position 42C, the header 66H illustratively conducts pressurized bypass air conducted through the second inlet passage 60 to the heat exchanger 40A along a flow path 74 through the face 70 as shown in FIG. 6.

The heat exchanger 40B is illustratively positioned within a heat exchanger passageway 76 defined by the heat exchanger housing 38 as shown in FIG. 6. Specifically, the heat exchanger 40B is positioned within the passageway 76 so that the heat exchanger 40B extends along a heat exchanger axis 43 that is substantially perpendicular to a face 78 of a core 80 of the heat exchanger 40B. When the valve system 42 is in the contacting position 42C, the header 66H illustratively conducts pressurized bypass air conducted through the second inlet passage 60 to the heat exchanger 40B along a flow path 82 through the face 78 as shown in FIG. 6.

The header 66H is illustratively an oblique header as shown in FIG. 6. The oblique header 66H conducts bypass air toward the respective cores 72, 80 of the heat exchangers 40A, 40B so that the flow of bypass air along the respective paths 74, 82 is not perpendicular to the respective faces 70, 78 of the cores 72, 80. The header 66H may be embodied as, or otherwise include, an oblique header that is arranged in a free-discharge configuration. In another example, the header 66H may be embodied as, or otherwise include, an oblique header that is arranged in a parallel-flow configuration.

The heat exchanger 40C is illustratively positioned within a heat exchanger passageway 84 defined by the heat exchanger housing 38 as shown in FIG. 6. Specifically, the heat exchanger 40C is positioned within the passageway 84 so that the heat exchanger 40C extends along a heat exchanger axis 45 that is substantially perpendicular to a face 86 of a core 88 of the heat exchanger 40C. When the valve system 42 is in the contacting position 42C, the header 64H illustratively conducts pressurized bypass air conducted through the first inlet passage 58 to the heat exchanger 40C along a flow path 90 through the face 86 as shown in FIG. 6.

The heat exchanger 40D is illustratively positioned within a heat exchanger passageway 92 defined by the heat exchanger housing 38 as shown in FIG. 6. Specifically, the heat exchanger 40D is positioned within the passageway 92 so that the heat exchanger 40D extends along a heat exchanger axis 47 that is substantially perpendicular to a face 94 of a core 96 of the heat exchanger 40D. When the valve system 42 is in the contacting position 42C, the header 64H illustratively conducts pressurized bypass air conducted through the first inlet passage 58 to the heat exchanger 40D along a flow path 98 through the face 94 as shown in FIG. 6.

The header 64H is illustratively an oblique header as shown in FIG. 6. The oblique header 64H conducts bypass air toward the respective cores 88, 96 of the heat exchangers 40C, 40D so that the flow of bypass air along the respective paths 90, 98 is not perpendicular to the respective faces 86, 94 of the cores 88, 96. The header 64H may be embodied as, or otherwise include, an oblique header that is arranged in a free-discharge configuration. In another example, the header 64H may be embodied as, or otherwise include, an oblique header that is arranged in a parallel-flow configuration.

Referring again to FIG. 6, the valve system 42 illustratively includes a first valve 100 and a second valve 102. The first valve 100 is configured to selectively direct bypass air passed through the inlet passage 58 and the header 64H into contact with the heat exchangers 40C, 40D. The second valve 102 is configured to selectively direct bypass air passed through the inlet passage 60 and the header 66H into contact with the heat exchangers 40A, 40B.

In the illustrative embodiment, the first and second valves 100, 102 are each in the contacting position 42C when the valve system 42 is in the contacting position 42C as shown in FIG. 6. The first and second valves 100, 102 are each in the diverting position 42D when the valve system 42 is in the diverting position 42D shown in FIG. 9. As used herein, the contacting and diverting positions 42C, 42D therefore refer to the individual positions of the valves 100, 102 and the positions of the valve system 42.

The first valve 100 illustratively includes a plate 104, a cylindrical pin 106, a pivot arm 108, and a slider coupler 110 as shown in FIG. 6. The plate 104 is positioned within the header 64H and extends radially substantially all the way through the header 64H. The pin 106 is received by the plate 104 so that the plate 104 and the pin 106 are coupled together for common rotation about a radial axis 114 defined by the pin 106. The pin 106 is received by the pivot arm 108 so that the pivot arm 108 and the pin 106 are coupled together for common rotation about the axis 114. The slider coupler 110 is coupled to the pivot arm 108 and an actuator 116 included in the valve system 42.

In one example, the actuator 116 may be embodied as, or otherwise include, an electrically-powered actuator such as an electrically-powered linear actuator. In another example, the actuator 116 may be embodied as, or otherwise include, a hydraulically-operated actuator such as a hydraulic piston.

The second valve 102 illustratively includes a plate 118, a cylindrical pin 120, a pivot arm 122, and a slider coupler 124 as shown in FIG. 6. The plate 118 is positioned within the header 66H and extends radially substantially all the way through the header 66H. The pin 120 is received by the plate 118 so that the plate 118 and the pin 120 are coupled together for common rotation about a radial axis 128 defined by the pin 120. The pin 120 is received by the pivot arm 122 so that the pivot arm 122 and the pin 120 are coupled together for common rotation about the axis 128. The slider coupler 124 is coupled to the pivot arm 122 and the actuator 116.

In addition to the actuator 116, the valve system 42 illustratively includes a guide track 130 and a slider 132. The guide track 130 is coupled to and supported by a separation wall 134 included in the heat exchanger housing 38 that separates the headers 64H, 66H from one another. The guide track 130 is formed to include a slider-receiving channel 136 that extends axially and is adapted to receive the slider 132. The slider 132 is received by the slider-receiving channel 136 so that the slider 132 is slidable in the channel 136 relative to the guide track 130. The slider 132 is coupled to the actuator 116 and each of the slider couplers 110, 124.

Figure 9:
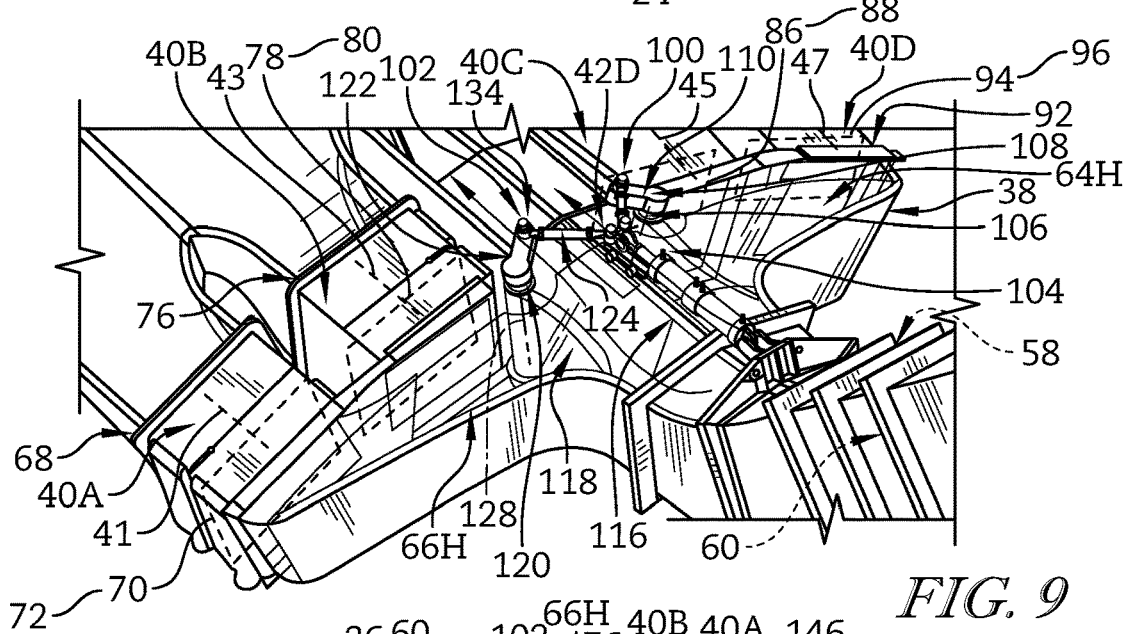
FIG. 9 is a perspective view of the propulsion system of FIG. 8 with portions of the gas turbine engine removed, showing that the valve system is movable in the heat exchanger housing to a second position arranged to divert pressurized bypass air passed through the inlet duct around the heat exchangers without contacting the heat exchangers.

Movement of the actuator 116 illustratively causes the plates 104, 118 to move within the respective headers 64H, 66H so that the first and second valves 100, 102 move between the contacting and diverting positions 42C, 42D as shown in FIGS. 6 and 9. Movement of the actuator 116 causes the slider 132 to slide within the slider-receiving channel 136 so that the slider couplers 110, 124 cause the respective pivot arms 108, 122 to rotate about the respective axes 114, 128. Rotation of the pivot arms 108, 122 about the axes 114, 128 cause the respective plates 104, 118 to rotate about the axes 114, 128 so that the first and second valves 100, 102 rotate between the contacting and diverting positions 42C, 42D.

Referring now to FIG. 7, in addition to the heat exchanger passageways 68, 76, 84, 92, the heat exchanger housing 38 illustratively defines a bypass passageway 138. The passageways 68, 76, 84, 92 are fluidly coupled to the inlet duct 36 and configured to conduct pressurized bypass air from the inlet duct 36 into contact with the respective heat exchangers 40A, 40B, 40C, 40D when the valve system 42 is in the contacting position 42C shown in FIG. 7. The bypass passageway 138 is fluidly coupled to the inlet duct 36 and configured to conduct bypass air from the inlet duct 36 around the heat exchangers 40A, 40B, 40C, 40D without contacting the heat exchangers 40A, 40B, 40C, 40D when the valve system 42 is in the diverting position 42D shown in FIG. 10.

The heat exchanger passageways 68, 76, 84, 92 are arranged circumferentially adjacent one another about the central axis 28 as shown in FIG. 7. In the illustrative embodiment, the bypass passageway 138 is arranged between the passageways 76, 84. In other embodiments, however, the bypass passageway 138 may be arranged relative to the passageways 68, 76, 84, 92 in another suitable arrangement.

In addition to the separation wall 134, the heat exchanger housing 38 illustratively includes exterior walls 140, 141, interior heat exchanger walls 142, 143, 144, 145, and interior bypass walls 146, 147 as shown in FIG. 7. The exterior wall 140 and the interior heat exchanger wall 142 cooperate to define the heat exchanger passageway 68. The interior heat exchanger wall 143 and the interior bypass wall 146 cooperate to define the heat exchanger passageway 76. The interior bypass walls 146, 147 cooperate to define the bypass passageway 138. The interior bypass wall 147 and the interior heat exchanger wall 144 cooperate to define the heat exchanger passageway 84. The interior heat exchanger wall 145 and the exterior wall 141 cooperate to define the heat exchanger passageway 92.

The separation wall 134 illustratively extends through the bypass passageway 138 as shown in FIG. 7. The separation wall 134 and the interior bypass wall 146 cooperate to define a first bypass passage 138A. The separation wall 134 and the interior bypass wall 147 cooperate to define a second bypass passage 138B. The first bypass passage 138A is configured to receive pressurized bypass air conducted thereto by the second inlet passage 60 and the header 66H when the valve system 42 is in the diverting position 42D. The second bypass passage 138B is configured to receive bypass air conducted thereto by the first inlet passage 58 and the header 64H when the valve system 42 is in the diverting position 42D.

The outlet duct 50 is fluidly coupled to the heat exchanger passageways 68, 76, 84, 92 and the bypass passageway 138 as shown in FIG. 7. Pressurized bypass air passed through the heat exchanger passageways 68, 76, 84, 92 when the valve system 42 is in the contacting position 42C is discharged by the outlet duct 50 to the fan duct 30 as suggested by FIG. 7. Bypass air passed through the first and second bypass passages 138A, 138B when the valve system 42 is in the diverting position 42D is discharged by the outlet duct 50 to the fan duct 30 as suggested by FIG. 10.

As best seen in FIGS. 5 and 8, the outlet duct 50 is shaped to discharge pressurized bypass air substantially only parallel to the central axis 28 to the fan duct 30. In some embodiments, bypass air discharged by the outlet 50 may be communicated to a space positioned outside of the gas turbine engine 20 or the nacelle 18.

Operation of the propulsion system 14 will now be described with reference to FIGS. 5-7. During operation of the gas turbine engine 20, the heat exchanger assembly 34 is operated so that the valve system 42 is in the contacting position 42C. When the valve system 42 is in the contacting position 42C, fluid passes along the path 24F from the engine core 24 to the heat exchangers 40 and is returned back to the engine core 24 by the heat exchangers 40. Bypass air discharged by the fan 26 is conducted through the first inlet passage 58, to the header 64H, and to each of the heat exchangers 40C, 40D. Bypass air discharged by the fan 26 is also conducted through the second inlet passage 60, to the header 66H, and to each of the heat exchangers 40A, 40B. The bypass air flows through the heat exchangers 40A, 40B, 40C, 40D such that heat is transferred from the fluid from the engine core 24 to the bypass air. As a result, the temperature of the bypass air increases, and the temperature of the fluid from the engine core 24 decreases. The increased temperature bypass air is then conducted to the outlet duct 50 and discharged therefrom to the fan duct 30. The cooled fluid from the engine core 24 is returned to the engine core 24 by the heat exchangers 40A, 40B, 40C, 40D.

Figure 10:
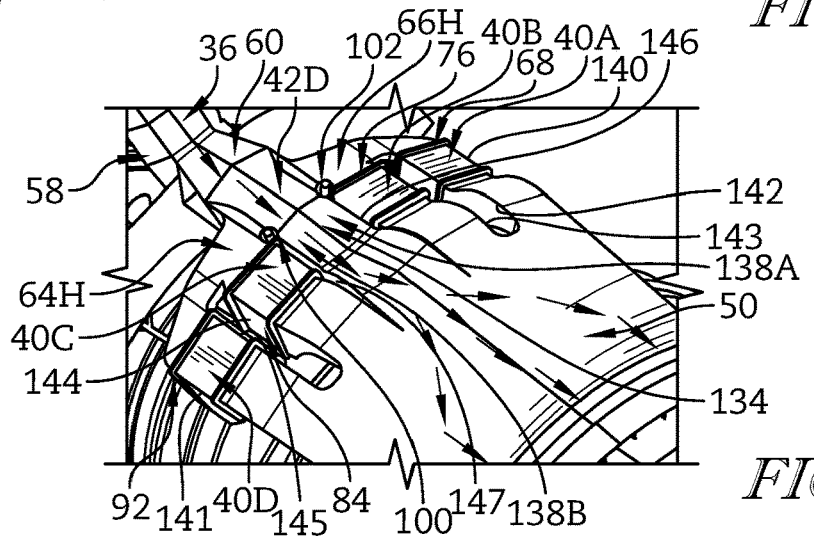
FIG. 10 is a perspective view of the propulsion system of FIG. 8 with portions of the heat exchanger assembly removed, showing that pressurized bypass air passed through the inlet duct and around the heat exchangers without contacting the heat exchangers is conducted through a bypass passageway formed in the heat exchanger housing before being discharged by the outlet duct.

Operation of the propulsion system 14 will now be described with reference to FIGS. 8-10. During operation of the gas turbine engine 20, the heat exchanger assembly 34 is operated so that the valve system 42 is in the diverting position 42D. When the valve system 42 is in the diverting position 42D, no fluid from the engine core 24 is provided to the heat exchangers 40. Additionally, when the valve system 42 is in the diverting position 42D, bypass air discharged from the fan 26 is conducted through the first and second inlet passages 58, 60, to respective headers 64H, 66H, through respective bypass passages 138B, 138A, and to the outlet duct 50 before being discharged by the outlet duct 50 to the fan duct 30. The temperature of the bypass air therefore remains substantially the same as the bypass air flows through the inlet duct 36, around the heat exchangers 40, and through the outlet duct 50.

Referring now to FIGS. 5-10, operation of the propulsion system 14 may vary in certain instances. In one instance, it may be desirable to manage the temperatures of components of the engine core 24. To do so, the heat exchanger assembly 34 may be operated to place the valve system 42 in the contacting position 42C, or in any other position between the contacting position 42C and the diverting position 42D to control the cooling of the medium to be cooled (i.e., fluid from the engine core 24). In other instances, it may be desirable to avoid pressure losses resulting from directing fluid from the engine core 24 to the heat exchanger assembly 34, and thereby increase the operating efficiency of the gas turbine engine 20. To do so, the heat exchanger assembly 34 may be operated to place the valve system 42 in the diverting position 42D. In such instances, fluid from the engine core 24 is not cooled by the heat exchanger assembly 34.

Figure 11:
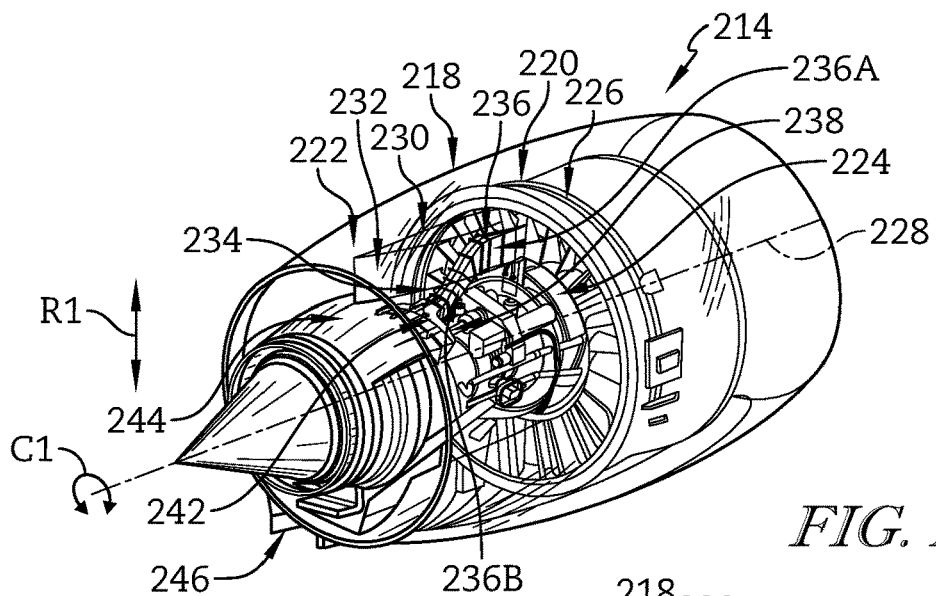
FIG. 11 is a perspective view of another propulsion system substantially similar to the propulsion system of FIG. 2.
Figure 12:
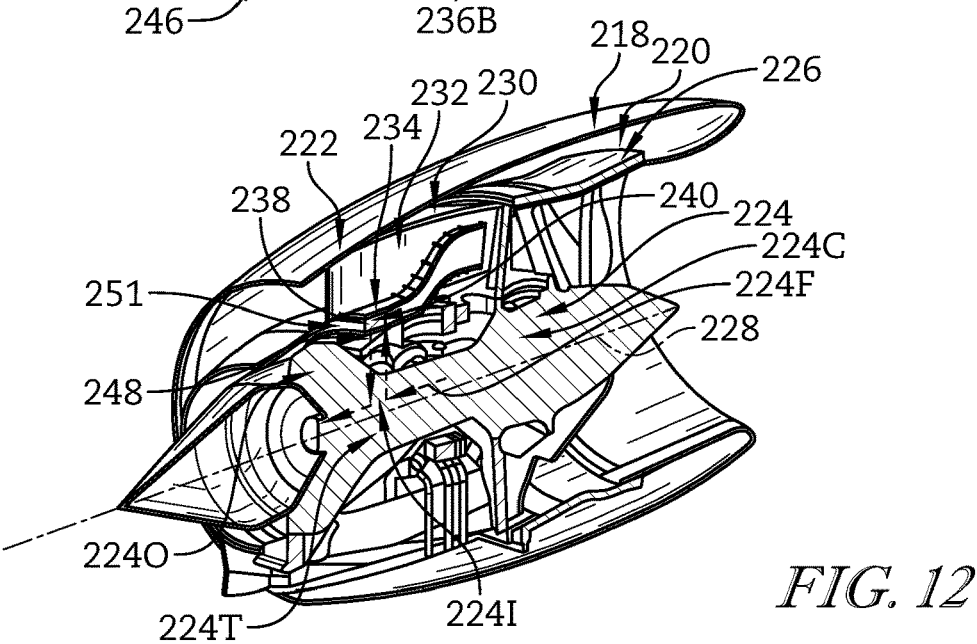
FIG. 12 is a sectional view of the propulsion system of FIG. 11 showing that a heat exchanger assembly included in the propulsion system is coupled to an engine core of a gas turbine engine included in the propulsion system.
Figure 13:
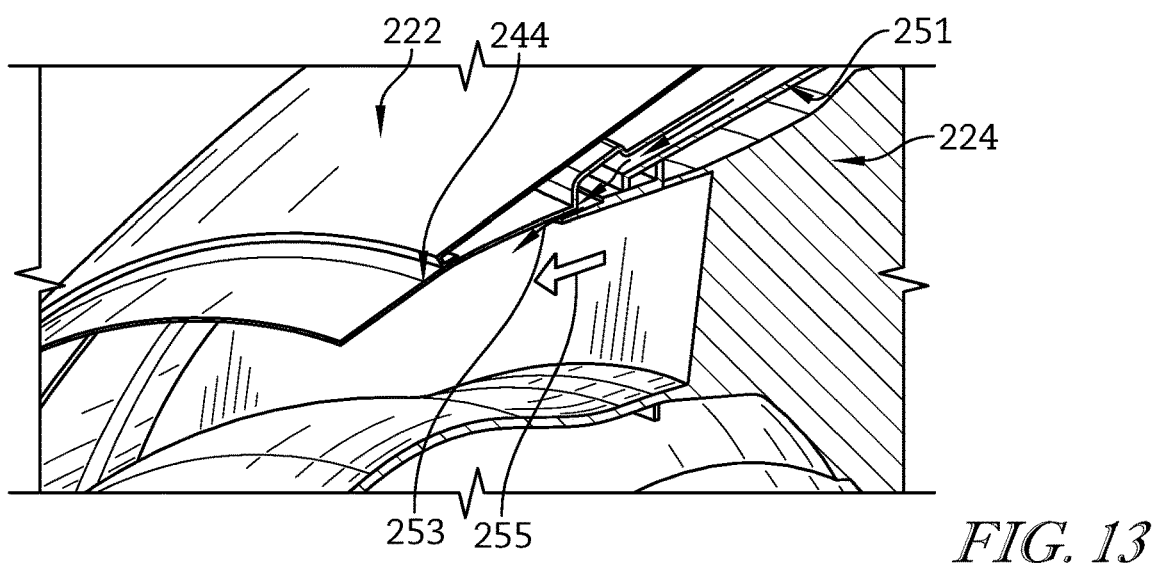
FIG. 13 is a detail view of the propulsion system of FIG. 12 showing that the heat exchanger assembly is configured to discharge pressurized bypass air discharged from a fan of the gas turbine engine into a core stream of pressurized air passed through the engine core.

Referring now to FIGS. 11-13, another illustrative propulsion system 214 adapted for use in the aircraft 10 is shown. The propulsion system 214 is substantially similar to the propulsion system 14 shown in FIGS. 1-10 and described herein. Accordingly, similar reference numbers in the 200 series indicate features that are common between the propulsion system 14 and the propulsion system 214. The description of the propulsion system 14 is hereby incorporated by reference to apply to the propulsion system 214, except in instances when it conflicts with the specific description and drawings of the propulsion system 214.

The propulsion system 214 illustratively includes a nacelle 218 and a gas turbine engine 220 as shown in FIGS. 11 and 12. The nacelle 218 is configured to couple to the airframe 12 of the aircraft 10 and mounted to the gas turbine engine 220. The nacelle 218 has an outer shroud 222 that surrounds at least a portion of the gas turbine engine 220. The gas turbine engine 220 is configured to generate thrust to move the aircraft 10 while being supported in the nacelle 218.

The gas turbine engine 220 illustratively includes an engine core 224 and a fan 226 that is coupled to the engine core 224 to be driven by the engine core 224 as shown in FIG. 11. The engine core 224 is configured to pass pressurized air therethrough so that the pressurized air flows aftward along a central axis 228 defined by the engine core 224. The fan 226 is configured to discharge pressurized bypass air that is passed around the engine core 224 through a fan duct 230 that extends along the central axis 228 coaxially with the engine core 224. The fan duct 230 is defined between the outer shroud 222 and the engine core 224. A strut 232 included in the nacelle 218 extends away from the engine core 224 through the fan duct 230 to the outer shroud 222 in a radial direction indicated by arrow R1 as shown in FIG. 11.

The propulsion system 214 further illustratively includes a heat exchanger assembly 234 as shown in FIGS. 11 and 12. The heat exchanger assembly 234 is fluidly coupled to the gas turbine engine 220 to cool fluid or gas from the gas turbine engine 220 and return the cooled fluid or gas to the gas turbine engine 220. The heat exchanger assembly 234 is configured to cool fluid or gas from the gas turbine engine 220 using pressurized bypass air that is passed through the fan duct 230.

The heat exchanger assembly 234 illustratively includes an inlet duct 236, a heat exchanger housing 238, heat exchangers 240, and a valve system 242 as shown in FIGS. 11-13. A portion 236A of the inlet duct 236 is positioned in the strut 232 and a portion 236B of the inlet duct 236 is positioned radially inward of the strut 232 relative to the central axis 228. The heat exchanger housing 238 is fluidly coupled to the portion 236B of the inlet duct 236 and positioned radially inward of the strut 232 relative to the central axis 228. The heat exchangers 240 are housed by the heat exchanger housing 238 and the valve system 242 is movable in the heat exchanger housing 238 from a contacting position (i.e., similar to the contacting position 42C) to a diverting position (i.e., similar to the diverting position 42D). The contacting position is arranged to direct pressurized bypass air received from the inlet duct 236 into contact with the heat exchangers 240. The diverting position is arranged to divert pressurized bypass air received from the inlet duct 236 around the heat exchangers 240 without contacting the heat exchangers 240.

When the valve system 242 is in the contacting position, fluid from the engine core 224 passes along a flow path 224F as shown in FIG. 12. Specifically, fluid from the engine core 224 passes along the flow path 224F from one component of the engine core 224 through the heat exchangers 240 and is returned to another component of the engine core 224 by the heat exchangers 240. In one embodiment, fluid may be provided to the heat exchangers 240 along the flow path 224F by a compressor 224C of the engine core 224 and returned to a turbine 224T of the engine core 224 along the flow path 224F to cool the turbine 224T.

In other embodiments, the heat exchangers 240 may be adapted to cool oil, fuel, or any other fluid that is provided thereto by the engine core 224 or by any other part of the aircraft 10. In those embodiments, fluid may be provided to the heat exchangers 240 by the engine core 224 or by any other part of the aircraft 10 along another suitable flow path. Additionally, in those embodiments, fluid provided to the heat exchangers 240 may be returned to the engine core 224 or any other part of the aircraft 10 along another suitable flow path.

The strut 232 illustratively extends radially through the fan duct 230 away from an engine case 244 of the gas turbine engine 220 to the outer shroud 222 as shown in FIG. 11. The strut 232 is spaced from a pylon 246 included in the nacelle 218 that is configured to couple to the airframe 212 and extends away from the gas turbine engine 220. Specifically, the strut 232 is spaced about 180 degrees from the pylon 246 about the central axis 228 in a circumferential direction indicated by arrow C1. When the propulsion system 214 is coupled to the airframe 12, the pylon 246 is positioned above the gas turbine engine 220, whereas the strut 232 is positioned below the engine 220. In other embodiments, however, the strut 232 and the pylon 246 may be arranged relative to the gas turbine engine 220 in other suitable arrangements.

The turbine 224T extends along the central axis 228 from a turbine inlet 224I to a turbine outlet 224O that is positioned aft of the turbine inlet 224I as shown in FIG. 12. An interior space 248 is radially defined between the turbine inlet 224I and the strut 232, and the heat exchanger housing 238 is illustratively positioned in the interior space 248. The illustrative positioning of the heat exchanger housing 238 allows more heat exchangers 240 to be included in the heat exchanger assembly 234 than would be the case if the heat exchanger housing 238 was positioned closer to the turbine outlet 224O along the central axis 228.

The heat exchanger assembly 234 illustratively includes an outlet duct 251 that is fluidly coupled to the heat exchangers 240. The outlet duct 251 is positioned radially inward of the strut 232 relative to the central axis 228 and the outlet duct 251 extends aft of the strut 232 along the central axis 228.

Unlike the outlet duct 50 of the propulsion system 14, the outlet duct 251 is configured to discharge pressurized bypass air provided thereto by the inlet duct 236 to the engine core 224 as shown in FIG. 13. Thus, bypass air discharged by the outlet duct 251 as indicated by arrows 253 mixes with core air passed through the engine core 224 as indicated by arrow 255 when the valve system 42 is in each of the contacting and diverting positions.

The present disclosure may provide means for cooling air discharged by a compressor of a gas turbine engine, such as the compressor 24C of the engine 20 or the compressor 224C of the engine 220, using bypass air discharged by a fan, such as the bypass air discharged by fan 26 or fan 226. The present concept may be embodied as an active cooling system that may be packaged as a single unit. The cooling system may capture fan air in the highest static pressure region along the vertical span of a leading edge lower bifurcation duct, such as the fan duct 30 or the fan duct 230, and exhaust air to ambient in the fan stream like the outlet duct 50 or to the engine core like the outlet duct 251.

The present disclosure may allow for conventional "boxy" shaped heat exchangers, such as the heat exchangers 40 or the heat exchangers 240, to be packaged on the engine core at the turbine entry engine station, such as the turbine inlet 24I or the turbine inlet 224I, where an adequate packaging envelope may exist. Advantages of the present concept may include minimal impact to the performance of the gas turbine engine, packaging benefits, non-intrusiveness to accessories mounted on the engine core, and packaging of heat exchangers having substantially equal width, length, and height dimensions.

The present concept may provide the ability to meter the bypass air flowing across the heat exchangers. The heat exchangers may be operated in a heat exchanger mode, such as when the valve system 42 is in the contacting position 42C, and a full bypass mode, such as when the valve system 42 is in the diverting position 42D.

The present concept may provide the ability to increase the performance of the gas turbine engine by avoiding a pressure drop when cooling via the heat exchangers is not required. The present concept may also provide the ability to manage the temperature and thermal gradients of engine core components to increase core component life.

The present concept may have a minimal impact on the engine core of the gas turbine engine. The present concept may be positioned aft of most of the accessories mounted on the engine core. The present concept may be positioned inside an unused lower-bifurcation duct and may extend over a distance that minimizes cold side ducting. The present concept may utilize oblique headers, such as the headers 64H, 66H, to the heat exchanger in order to reduce space that would otherwise be taken up with a long and large diffusion path. The oblique headers may maintain a substantially constant pressure difference across the heat exchangers to facilitate a uniform flow of air across the heat exchangers.

The present disclosure may have a minimal impact on the nacelle of the aircraft, such as the nacelle 18 or the nacelle 218 of the aircraft 10. The nacelle may seal against the cooling system (e.g., against the strut 32 and/or the inlet duct 36) and be easily accessible during routine maintenance of the aircraft. The cooling system may allow additional heat exchangers to be circumferentially arranged in the cooling system depending on the size of the heat exchangers and the overall operational heat load experienced by the heat exchangers.

The present concept may also provide redundancy through two independent flow circuits, such as the first and second inlet passages 58, 60. The present concept may also provide redundancy through two valves, such as the first and second valves 100, 102 of the valve system 42, that are actuatable in tandem with one another.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A propulsion system for an aircraft, the propulsion system comprising
    a gas turbine engine including an engine core defining a central axis and a fan coupled to the engine core, the fan configured to discharge pressurized bypass air that is passed by the engine core through a fan duct that extends along the central axis coaxially with the engine core, and
    a nacelle mounted to the gas turbine engine, the nacelle including an outer shroud that surrounds at least a portion of the engine core defining a portion of the fan duct and a strut that extends away from the engine core through the fan duct to the outer shroud,
    a heat exchanger assembly fluidly coupled to the gas turbine engine to cool fluid or gas from the gas turbine engine and return the cooled fluid or gas to the gas turbine engine, the heat exchanger assembly including an inlet duct having at least a portion positioned in the strut, a heat exchanger housing coupled fluidly to the inlet duct and positioned radially inward of the strut relative to the central axis, heat exchangers housed by the heat exchanger housing, and
    a valve system disposed downstream of the inlet duct and movable in the heat exchanger housing from a first position arranged to direct pressurized bypass air received from the inlet duct into contact with the heat exchangers to a second position arranged to divert pressurized bypass air received from the inlet duct through at least one bypass passageway disposed between the heat exchangers, away from the inlet duct without contacting the heat exchangers, and directly to the fan duct.

2. The propulsion system of claim 1, wherein the heat exchanger assembly further includes an outlet duct fluidly coupled to the heat exchangers that extends aft of the strut along the central axis.

3. The propulsion system of claim 2, wherein the engine core is configured to discharge core air that is passed through the engine core along the central axis and the outlet duct is configured to receive the pressurized bypass air from the inlet duct and discharge the pressurized bypass air into the core air when the valve system is in the first position.

4. The propulsion system of claim 2, wherein (i) the heat exchanger housing defines at least one heat exchanger passageway fluidly coupled to the inlet duct and configured to conduct pressurized bypass air from the inlet duct into contact with the heat exchangers when the valve system is in the first position and the at least one bypass passageway fluidly coupled to the inlet duct and configured to conduct pressurized bypass air from the inlet duct past the heat exchangers without contacting the heat exchangers when the valve system is in the second position and (ii) the outlet duct is fluidly coupled to the at least one heat exchanger passageway and the at least one bypass passageway.

5. The propulsion system of claim 4, wherein at least two heat exchanger passageways are spaced apart circumferentially from one another about the central axis.

6. The propulsion system of claim 1, wherein the engine core includes a turbine having an inlet and an outlet positioned aft of the inlet along the central axis, an interior space is defined in a radial direction relative to the central axis between the inlet of the turbine and the strut, and the heat exchanger housing is positioned in the interior space.

7. The propulsion system of claim 1, wherein each of the heat exchangers has a core having a face and pressurized bypass air directed into contact with the heat exchangers by the valve system when the valve system is in the first position is conducted by headers included in the heat exchanger housing to the core of each of the heat exchangers at an angle to the face of each of the heat exchangers that is different from 90 degrees.

8. A propulsion system for an aircraft, the propulsion system comprising
- a gas turbine engine including an engine core arranged along a central axis and a fan coupled to the engine core, the fan configured to discharge pressurized bypass air that is passed by the engine core,
- a nacelle surrounding a portion of the gas turbine engine, the nacelle including a strut that extends away from the gas turbine engine,
- a heat exchanger assembly fluidly coupled to the gas turbine engine to cool fluid or gas from the gas turbine engine, the heat exchanger assembly including an inlet duct arranged in the strut and a plurality of heat exchangers positioned radially inward of the strut relative to the central axis, and
- a valve system that is movable from a first position arranged to direct pressurized bypass air received from the inlet duct into contact with the plurality of heat exchangers to a second position arranged to divert pressurized bypass air received from the inlet duct past the plurality of heat exchangers without contacting the plurality of heat exchangers and directly to an outlet duct aft of the strut that is fluidly coupled to at least two heat exchanger passageways and a bypass passageway,
- wherein the bypass passageway is arranged circumferentially between the at least two heat exchanger passageways.

9. The propulsion system of claim 8, wherein the fan is configured to discharge pressurized bypass air in a direction having a circumferential component and an axial component at an outlet thereof and the inlet duct is shaped to open axially and circumferentially to receive the pressurized bypass air discharged from the fan.

10. The propulsion system of claim 8, wherein the heat exchangers are fluidly coupled to the inlet duct such that a portion of the inlet duct is positioned radially inward of the strut relative to the central axis.

11. The propulsion system of claim 8, wherein the heat exchanger assembly further includes a heat exchanger housing that houses the heat exchangers and is fluidly coupled to the inlet duct and the valve system.

12. The propulsion system of claim 11, wherein the outlet duct is fluidly coupled to the heat exchangers that is positioned radially inward of the strut relative to the central axis.

13. The propulsion system of claim 12, wherein the engine core is configured to discharge core air that is passed through the engine core along the central axis and the outlet duct is configured to receive the pressurized bypass air from the inlet duct and discharge the pressurized bypass air into the core air when the valve system is in the first position.

14. A propulsion system for an aircraft, the propulsion system comprising
- a gas turbine engine including an engine core and a fan coupled to the engine core, the fan configured to discharge pressurized bypass air that is passed by the engine core,
- a nacelle surrounding a portion of the gas turbine engine, and
- a heat exchanger assembly fluidly coupled to the gas turbine engine to cool fluid or gas from the gas turbine engine, the heat exchanger assembly including an inlet duct having a divider wall defining a first inlet passage and a second inlet passage, a heat exchanger housing fluidly coupled to the inlet duct, first heat exchangers housed by the heat exchanger housing and fluidly coupled to the first inlet passage, second heat exchangers housed by the heat exchanger housing and fluidly coupled to the second inlet passage, a first valve that is movable in the heat exchanger housing from a contacting position in contact with the divider wall arranged to direct pressurized bypass air passed through the first inlet passage into contact with the first heat exchangers to a diverting position in contact with a first inlet passage wall arranged to divert pressurized bypass air passed through the first inlet passage past the first heat exchangers without contacting the first heat exchangers, and a second valve that is movable in the heat exchanger housing from a contacting position in contact with the divider wall arranged to direct pressurized bypass air passed through the second inlet passage into contact with the second heat exchangers to a diverting position in contact with a second inlet passage wall arranged to divert pressurized bypass air passed through the second inlet passage past the second heat exchangers without contacting the second heat exchangers,
- wherein the fan is configured to discharge pressurized bypass air in a direction having a circumferential component and an axial component at an outlet thereof and each of the first and second inlet passages is shaped to open axially and circumferentially to receive the pressurized bypass air discharged from the fan so that the total pressure of the pressurized bypass air is captured by the first and second inlet passages during operation of the propulsion system.

15. The propulsion system of claim 14, wherein the first heat exchangers each have a core having a face and pressurized bypass air directed into contact with the first heat exchangers by the first valve when the first valve is in the contacting position is conducted by a first header included in the heat exchanger housing to the core of each of the first heat exchangers at an angle to the face of each of the first heat exchangers that is different from 90 degrees.

16. The propulsion system of claim 15, wherein the second heat exchangers each have a core having a face and pressurized bypass air directed into contact with the second heat exchangers by the second valve when the second valve is in the contacting position is conducted by a second header included in the heat exchanger housing to the core of each of the second heat exchangers at an angle to the face of each of the second heat exchangers that is different from 90 degrees.

17. The propulsion system of claim 14, wherein the first valve includes a first plate, the first plate is coupled to an actuator, and the actuator is operable to pivot the first plate within the heat exchanger housing to cause the first valve to move between the contacting and the diverting positions.

18. The propulsion system of claim 17, wherein the second valve includes a second plate, the second plate is coupled to the actuator, and the actuator is operable to pivot the second plate within the heat exchanger housing to cause the second valve to move between the contacting and diverting positions.

* * * * *